Oct. 24, 1961

A. H. ROBSON 3,005,887

AIR FLOW CONTROL APPARATUS

Filed April 16, 1958

*INVENTOR.*
AUBREY H. ROBSON

BY *Edward C. Arens*

ATTORNEY

*INVENTOR.*
AUBREY H. ROBSON

BY Edward C. Arenz

ATTORNEY

United States Patent Office 3,005,887
Patented Oct. 24, 1961

3,005,887
AIR FLOW CONTROL APPARATUS
Aubrey H. Robson, Rock Island, Ill., assignor to American Air Filter Company, Inc., Louisville, Ky., a corporation of Delaware
Filed Apr. 16, 1958, Ser. No. 728,925
3 Claims. (Cl. 200—81.9)

This invention relates generally to portable forced air heaters and relates in particular to apparatus for controlling the air flow of such a device.

The apparatus of the present invention is particularly suited for use with portable air heaters of the type employed for heating and/or ventilating electronic compartments, missile bays and cockpits of aircraft. Therefore, the following will refer primarily to such air heaters although it will be apparent that the invention may be utilized readily in connection with other devices of similar character.

The ventilating air system of such heaters conventionally comprise: a prime mover such as a gasoline engine or electric motor; a ventilating air blower for causing a draft of ventilating air, the blower being driven by the prime mover; a heat exchanger which receives and may temper the ventilating air flowing therethrough; air flow damper means in dual parallel ventilating air outlets of the heater, the damper means normally being controlled manually to proportion the division of air flow for the served space; and flexible duct means for conveying the ventilating air flow to the aircraft or space to be served. The burner or combustor system for supplying heat to the heat exchanger is controlled automatically after the operator adjusts the controls to deliver ventilating air of the selected temperature.

In the operation of these units, it is desirable to maintain a relatively constant load on the prime mover driving the ventilating air blower. Hence, the factors affecting the air density, such as atmospheric pressure and temperature, complicate the problems of controlling the mass flow rate or weight of air being handled by the ventilating air blower. Other problems experienced in such control arise from variations in back pressure or resistance to air flow exerted by the served space; said variations normally being relatively minor from an air flow rate standpoint while the heater is still connected to any one served aircraft, but assuming major proportions when the air delivery system of the heater is disconnected from the served aircraft. Still another problem arises in connection with heat exchanger capacity and the automatic temperature control system when changes in the flow rate of the air occur due to any of the above factors.

Thus, the principal object of this invention is to provide air flow control apparatus which substantially minimizes, if not eliminates, the aforesaid problems in the operations of such heaters.

More specifically, some of the objects of the invention are to provide air flow control apparatus which is operative to: prevent overloading the prime mover which drives the ventilating air blower; maintain air flow rate within a range not exceeding the heat exchanger capacity; minimize hunting of the automatic temperature control system; and respond to variations in air velocity pressure.

In accordance with my invention, I provide means responsive to pressure variations in the ventilating air system of the heater for energizing power means which drives damper means in one direction or another in response to sensed air flow conditions. To minimize hunting of the temperature control system, the power means cause movement of the damper means only when the sensed pressure is above or below a predetermined pressure range. To obtain relatively close control of mass air flow rate irrespective of variations of air density and outlet resistance the apparatus is preferably arranged to control in response to velocity pressures in the system.

An embodiment of the invention is illustrated in the accompanying drawing, wherein.

Figure 1:
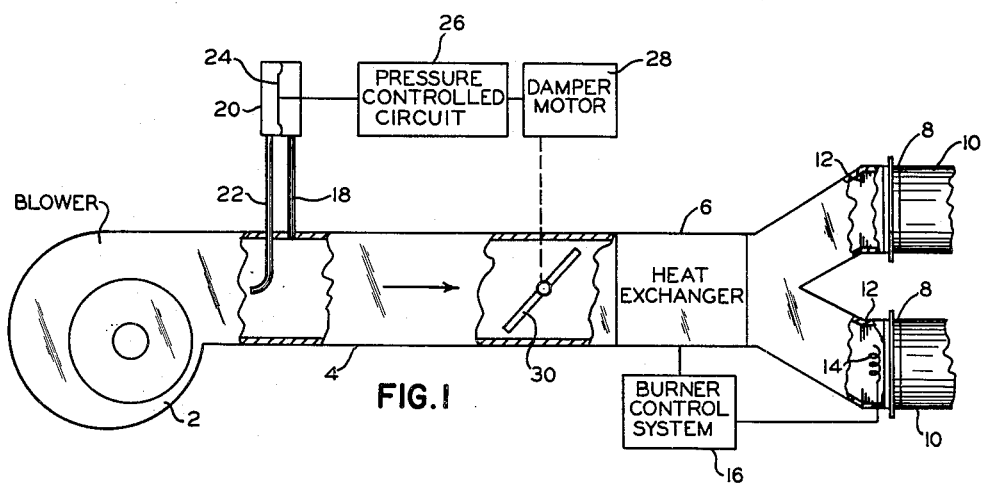
FIGURE 1 is a somewhat diagrammatic view of the ventilating air system of an air heater.

Referring to FIGURE 1 of the drawing, the ventilating air blower 2 is suitably driven by a prime mover (not shown) and arranged to draw in atmospheric air and cause it to flow through internal duct system 4 of the heater. A heat exchanger 6 of the general type illustrated in Hubbard U.S. Patent 2,744,516, granted May 8, 1956, may be advantageously used to temper the ventilating air as it flows to the heater duct system outlets 8. Flexible ducts 10 are utilized to carry the ventilating air from one or both outlets 8 to the served space.

Each outlet is provided with a manually controlled damper 12 of the iris type which may be adjusted to divide the air flow between the ducts 10 in accordance with the particular space being served. It will be apparent that one damper for one outlet may be closed and only the other outlet used. A temperature sensing element 14 is disposed in one air outlet and is connected to the burner control system 16 for the purpose of detecting variations in the selected discharge air temperature.

A static air pressure line 18 interconnects the duct system 4 with one side of a sealed diaphragm housing 20, and a total air pressure line 22 interconnects the duct system with the opposite side of the diaphragm housing. Thus, with the static pressure line 18 and total pressure line 22 connected to opposite sides of the housing 20, the pressure differential across the diaphragm membrane assembly 24 will be the velocity air pressure in the duct 4, and the membrane assembly will move in one direction or the other in response to changes in the sensed velocity pressure. The movement of the membrane assembly is utilized to control the operation of a pair of switches which are a part of the pressure controlled circuit 26. This circuit, as will be explained hereinafter in detail, controls the energization of damper motor 28 which operates the automatic damper 30.

Figure 2:
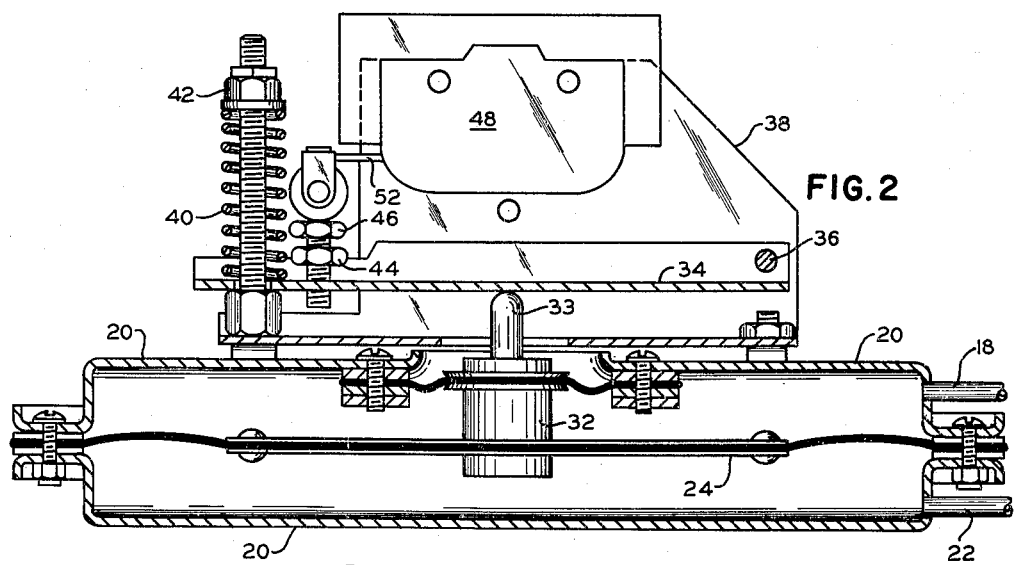
FIGURE 2 is a partly sectional view of a diaphragm and switch mechanism utilized in the invention.
Figure 3:
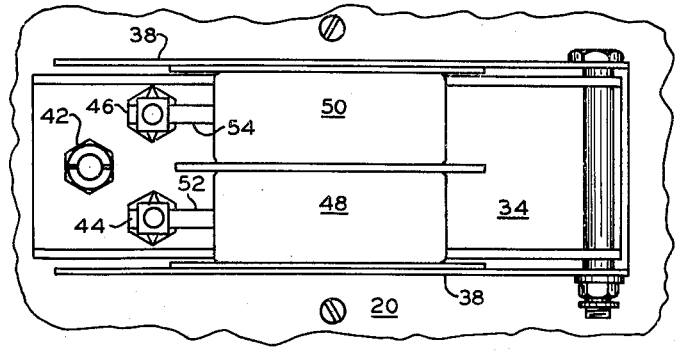
FIGURE 3 is a partial plan view of the diaphragm and mechanism of FIGURE 2.

One specific form of diaphragm and associated switch means which may be conveniently used in practicing the invention is illustrated in FIGURES 2 and 3. The flexible membrane 24 is displaceable in one direction or another in accordance with an increase or decrease in velocity pressure in duct 4. A push pin assembly 32 is mechanically connected to the membrane assembly 24 for displacement therewith and includes an upwardly projecting extremity 33 which contacts the underside of plate 34. The plate 34, which is channel-like in cross-section, is pivotally mounted at its right end by bolt 36 to a supporting frame 38 mounted on the diaphragm housing 20.

The plate 34 is biased at its left end towards the diaphragm housing by spring 40. In other words the plate 34 is biased in a direction to oppose an increasing velocity pressure in the duct system 4. An adjustable nut 42 is provided to adjust the pressure exerted by the spring.

The plate 34 carries a pair of bolts 44 ad 46 near the biased end of the plate. As shown in FIGURE 2, these bolts are aligned in a front to rear direction, the rear bolt 46 projecting upwardly somewhat more than front bolt 44. Both bolts are adjustable in a vertical direction with respect to the plate so that the projection of the bolt heads above the plate may be varied in accordance with the desired velocity pressure range.

The frame 38 has mounted thereon a front microswitch 48 and a rear microswitch 50. Each microswitch has a projecting arm which is operative to actuate the switch. The front microswitch arm 52 is disposed with its free end in the path of movement of bolt 44, and the rear microswitch arm 54 is disposed with its free end in the path of movement of bolt 46.

The bolt 46 is adjusted so that when the velocity pressure in duct 4 increases above a predetermined first velocity pressure the displacement upwardly of the membrane assembly 24 and push pin 32 due to the corresponding pressure differential existing across the membrane assembly will cause switch 50 to be moved from a first position to a second position by the bolt head 46 engaging the roller of arm 54. With any further increase in velocity pressure, switch 50 will remain electrically in its second position. Bolt 44 is adjusted so that when the velocity pressure increases above a predetermined second velocity pressure of somewhat greater magnitude than the first predetermined velocity pressure, the bolt head 44 engaging the roller of arm 52 will cause switch 48 to be actuated from its first to its second position. As with switch 50, a further increase in velocity pressure will not change the electrical position of switch 48.

As the velocity pressure progressively decreases from a value above the predetermined second velocity pressure, switch 48 is actuated from its second position to its first position as the velocity pressure decreases below the predetermined second velocity pressure. Upon a further decrease in velocity pressure to a value below the predetermined first velocity pressure, switch 50 returns to its first position. Thus, it will be apparent that: with a pressure below a predetermined first or lower value, both switches are in their first position; in the range of pressure between the first and second or upper value, switch 50 is in its second position while switch 48 remains in its first position; and with a pressure above the second value, both switches are in their second position.

While for clarity of explanation each switch has been stated to be actuated from one electrical position to another at a single velocity pressure, the inherent characteristics of the conventional snap-acting microswitches utilized in practice result in a small differential in pressure at which the switch is actuated in one direction upon a rise in velocity pressure, and in the opposite direction with a decrease in velocity pressure. This differential does not materially affect the operation of the invention in practice.

Figure 4:
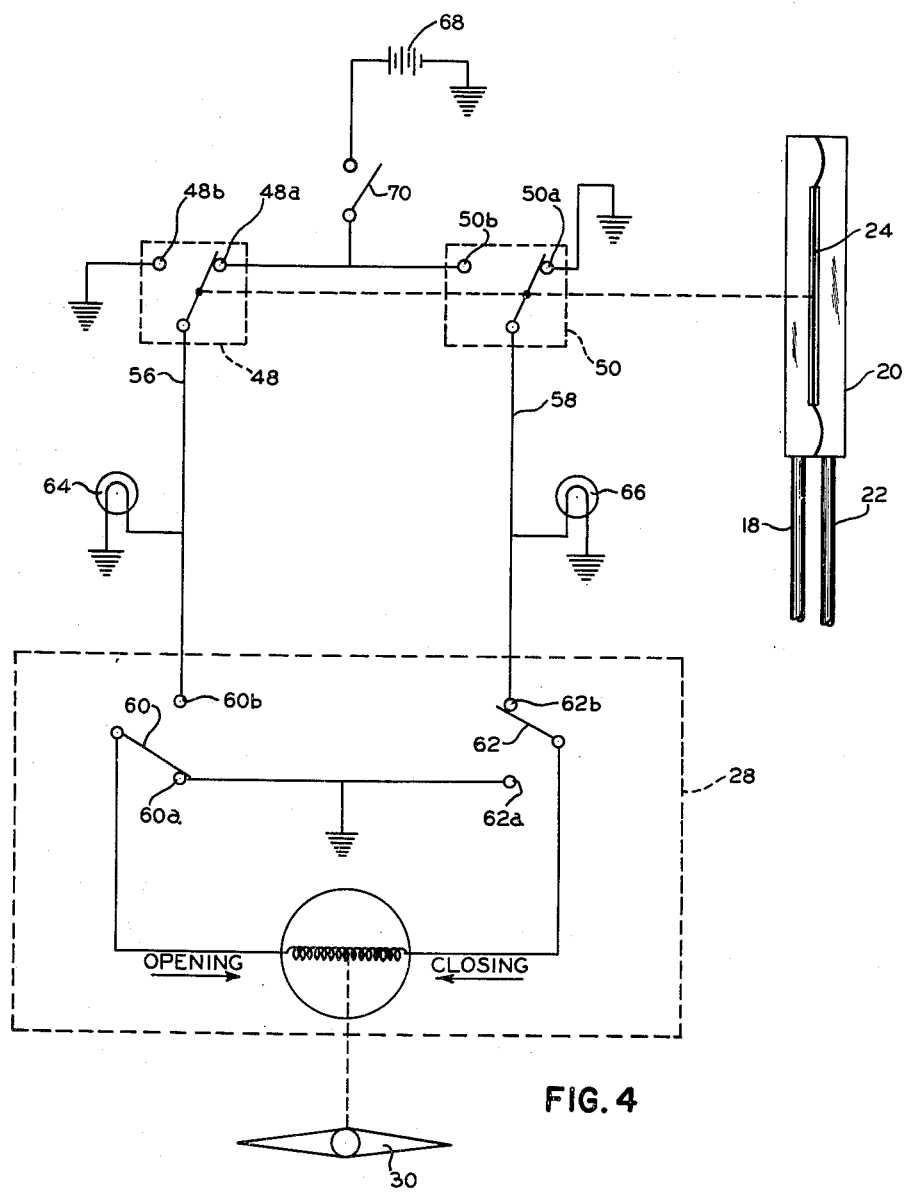
FIGURE 4 is a diagrammatic view of the electrical circuit and associated components of the invention.

Referring now to FIGURE 4, conductors 56 and 58 connect switches 48 and 50 respectively to opposite sides of the electrically powered reversible damper motor 28. Limit switches 60 and 62 may be an integral part of the damper motor assembly and operate to break the circuit when the damper motor reaches either extreme end of its travel. Indicator lamps 64 and 66 are connected between conductors 56 and 58 respectively, and ground. An electrical power source is designated 68 and a power switch 70. The damper motor is of the type wherein current flow in one direction through the winding causes the damper 30 to be moved in an opening direction and current flow in the opposite direction causes the damper to be moved in a closing direction. The direction of current flow causing movement of the damper in one direction or the other is indicated by the arrows in FIGURE 4.

*Operation*

For purposes of explanation, it will be assumed that the heater power had been cut while the heater was delivering air against a relatively high resistance and that both the manual dampers 12 and automatic damper 30 are fully open. It will also be assumed that the new served space offers considerably less resistance to air flow. With this assumption, the switches would be in the position shown in FIGURE 4 when power is supplied to the circuit by closing switch 70.

While the velocity pressure in duct 4 is increasing towards a predetermined first value of, say, 3.8 inches water gauge, the damper motor will not be energized since switch 50 is in its first or contact 50a position and limit switch 60 is in contact 60a position. At the velocity pressure of 3.8 inches, switch 50 is moved by the displacement of the diaphragm assembly to its second or contact 50b position. In this position, the current flows through the damper motor 28 in a closing direction through switch 50, conductor 58, limit switch 62, and passes to ground through limit switch 60. The damper motor will begin to rotate and will move the damper 30 from its extreme open position towards a closed position. This causes the limit switch 60 to be operated to its 60b position which stops current flow and consequently the operation of the damper motor.

Ordinarily, this slight movement of the damper 30 from its extreme open position will not impose sufficient resistance to air flow to prevent the progressive increase of velocity pressure. When the velocity pressure reaches a value of, say, 4.2 inches, the increased displacement of the diaphragm assembly 24 causes switch 48 to be moved from its 48a or first position to its 48b or second position and current will again flow in a closing direction through the damper motor. When the damper 30 is displaced sufficiently to restrict the air flow through the duct to a value below 4.2 inches, switch 48 will be moved back to its 48a contact position by the decreased displacement of the diaphragm assembly, and no current will flow in the damper motor.

If the damper 30 has been moved, as a result of the foregoing, to a position wherein the velocity pressure drops below 3.8 inches (that is, the damper 30 has overcompensated), the switch 50 will move to its 50a position and current will flow in an opening direction through the damper motor until the damper moves to a position which permits air flow with a velocity pressure exceeding 3.8 inches. In practice, it has been found that the damper 30 will normally overshoot once in its movement in each direction before stopping in a position which results in a velocity pressure in the desired range.

The limit switches 60 and 62 are in their "b" positions during normal operation. Limit switch 60 moves to its "a" position only when the damper motor is operated to its end travel corresponding to a fully open damper 30 position and limit switch 62 moves to its "a" position only when the damper motor is operated to its opposite end travel position.

It will be apparent that if, because of variations in resistance to air flow of the served aircraft or space, the velocity pressure in the duct departs from the desired range of 3.8 inches to 4.2 inches for example, the damper will move in one direction or another to bring the velocity pressure back within the ranges. It will also be apparent that variation in velocity pressure within the range will not disturb the position of the damper. This is distinctly advantageous over a constantly hunting type of air flow control which results in a constantly hunting temperature control system.

Indicator lamps 64 and 66 operate as follows. When the velocity pressure in the duct 4 is below the lower limit of the desired pressure range lamp 64 will be lit. When the velocity pressure is within the desired range, both lamps 64 and 66 will be lit. When the velocity pressure is above the desired range, only lamp 66 will be lit. These lamps thus serve to indicate to the operator whether the velocity pressure in the duct is within the desired range, or whether it is above or below the range. They also provide a simple means of indicating whether the apparatus is properly performing by observation of the sequence in which they light. Additionally, they may be readily utilized to furnish the operator with a convenient means of observing function of the apparatus when adjusting the spring 40 biasing the plate, or the bolts 44 and 46 which operate the switches.

Since these air heaters are required to give service in various localities having air temperatures ranging anywhere from —65° F. to over 100° F. the preferred arrangement is to sense velocity air pressure. However, it will be appreciated by those skilled in the art that the floating control feature of the present invention may be obtained by utilizing fan static pressure or total pressure by sensing either of these pressures between the fan and automatically controlled damper. It will be understood however that when both variations in outlet air resistance and variations in air density are encountered, velocity pressure is preferred since it most closely reflects the power needed to produce a specific mass air flow rate.

It is to be noted that while the switches 48 and 50 have been described as being in series in the circuit supplying power to the damper motor, they may, in an alternative embodiment, be connected to energize relays which are in the power circuit. It is also to be noted that the values given as limits of the pressure range are given only by way of example and not as limitations.

Having described my invention, I claim:

1. In a forced air heater-ventilator unit having air duct damper means controlled in response to departures in air duct velocity pressures from a predetermined air velocity pressure range, an air velocity pressure responsive device comprising: plate means pivotally fixed at one of its ends for pivotal movement thereabout in response to velocity pressure variations; spring means opposing pivotal movement of said plate means in a velocity pressure increasing direction; first and second snap acting electrical switches disposed adjacent one surface of said plate means; first and second switch elements for actuating said switches on said plate means and disposed to be moved into and out of switch actuating engagement with said switches upon pivotal movement of said plate means in a velocity pressure increasing and decreasing direction respectively; and means for selectively adjusting said actuating elements relative to said switches to provide selective sequential actuation of said switches corresponding to the limits of said velocity pressure range.

2. The device of claim 1 including: means for adjusting said spring means to vary opposition to pivotal movement of said plate means, said adjusting means being adjustable independently of said actuating elements whereby said velocity pressure range is adapted to be shifted as a whole.

3. In a forced air heater-ventilator unit in which air flow in a duct is controlled by varying resistance to air flow in said duct in accordance with variations in air velocity pressure in said duct, an improved apparatus responsive to departures in air velocity pressure from a predetermined air velocity pressure range comprising: push pin means displaceable in one direction upon an increase in said velocity pressure and in the opposite direction upon a decrease in said velocity pressure; plate means mounted at one of its ends for pivotal movement thereabout in accordance with said push pin means displacement; spring means engaging said plate means in opposition to pivotal movement of said plate means said one way; means for adjusting said spring means for varying said opposition; first and second snap acting electrical switches having arms for actuating said switches from one electrical contact position to another; first and second switch operating elements mounted on said plate means at positions adapting said elements to be moved into selective engagement with said first and second switch arms respectively upon pivotal movement of said plate means said one way; and means for selectively adjusting said switch operating elements for selective actuation of said switches at different degrees of pivotal movement of said plate means corresponding to selected limits of said air velocity pressure range.

References Cited in the file of this patent

UNITED STATES PATENTS

| | | |
|---|---|---|
| 1,713,833 | Kochendorfer | May 21, 1929 |
| 2,261,300 | Smith | Nov. 4, 1941 |
| 2,289,882 | Myers | July 14, 1942 |
| 2,600,508 | Nelson | June 17, 1952 |
| 2,661,450 | Moler | Dec. 1, 1953 |
| 2,662,547 | Comeau | Dec. 15, 1953 |
| 2,731,974 | Krueger | Jan. 24, 1956 |
| 2,742,544 | Lovick | Apr. 17, 1956 |
| 2,790,044 | Booth | Apr. 23, 1957 |
| 2,873,332 | Williams | Feb. 10, 1959 |
| 2,890,305 | Gutkowski | June 9, 1959 |